(12) United States Patent
Lim

(10) Patent No.: US 7,050,809 B2
(45) Date of Patent: May 23, 2006

(54) SYSTEM AND METHOD FOR PROVIDING CONCURRENT DATA TRANSMISSIONS IN A WIRELESS COMMUNICATION NETWORK

(75) Inventor: Jae Doeg Lim, Allen, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 520 days.

(21) Appl. No.: 10/034,399

(22) Filed: Dec. 27, 2001

(65) Prior Publication Data

US 2003/0125025 A1 Jul. 3, 2003

(51) Int. Cl.
*H04Q 7/20* (2006.01)

(52) U.S. Cl. ............... 455/445; 455/424; 455/428; 455/456.1; 370/218; 370/355; 370/395.52; 370/473; 370/902; 370/912; 370/913

(58) Field of Classification Search ............ 455/63.1, 455/404.1, 404.2, 422.1, 424, 428, 435.1, 455/445, 447, 450, 452.1, 456.1, 464, 504; 370/218, 347, 353–356, 389, 394, 395.52, 370/473, 902, 912, 328, 329, 335, 336, 337, 370/345, 349

See application file for complete search history.

(56) References Cited

U.S. PATENT DOCUMENTS

| | | | | |
|---|---|---|---|---|
| 6,069,885 A * | 5/2000 | Fong et al. | ............... | 370/336 |
| 6,084,888 A * | 7/2000 | Watanabe et al. | ............ | 370/473 |
| 6,262,980 B1 * | 7/2001 | Leung et al. | ............... | 370/336 |
| 6,323,823 B1 * | 11/2001 | Wong et al. | ................ | 343/844 |
| 6,400,697 B1 * | 6/2002 | Leung et al. | ................ | 370/328 |
| 6,426,814 B1 * | 7/2002 | Berger et al. | ................. | 398/45 |
| 6,584,084 B1 * | 6/2003 | Barany et al. | ............... | 370/329 |
| 6,597,681 B1 * | 7/2003 | Conner | ....................... | 370/347 |
| 6,728,554 B1 * | 4/2004 | Wegner | .................... | 455/562.1 |
| 6,842,446 B1 * | 1/2005 | Everson et al. | ............. | 370/349 |
| 6,894,994 B1 * | 5/2005 | Grob et al. | ................ | 370/335 |
| 6,915,128 B1 * | 7/2005 | Oh | ............................ | 455/424 |
| 2001/0036830 A1 * | 11/2001 | Wu et al. | ..................... | 455/436 |
| 2002/0068588 A1 * | 6/2002 | Yoshida et al. | ............. | 455/461 |
| 2002/0097700 A1 * | 7/2002 | Alastalo et al. | ............. | 370/338 |
| 2002/0151310 A1 * | 10/2002 | Chung et al. | ............... | 455/452 |
| 2002/0159449 A1 * | 10/2002 | Carson et al. | .............. | 370/389 |
| 2002/0163906 A1 * | 11/2002 | Diachina et al. | ............ | 370/349 |
| 2002/0196749 A1 * | 12/2002 | Eyuboglu et al. | ........... | 370/328 |
| 2003/0026240 A1 * | 2/2003 | Eyuboglu et al. | ........... | 370/349 |

* cited by examiner

*Primary Examiner*—William Trost
*Assistant Examiner*—James D Ewart

(57) ABSTRACT

A system and method is disclosed for providing concurrent data transmissions in a wireless communication network. The invention comprises a register unit within a base transceiver station that prepares data packets to be transmitted to mobile stations within a plurality of cell sectors. The register unit identifies the cell sector destination of each data packet in a first data call and sends the data packet to a buffer associated with the cell sector destination. The buffers store their respective data packets for each cell sector in a first subframe of a data frame. The buffers send their respective data packets within the first subframe to their respective antennas. The data packets for each cell sector are then concurrently transmitted during the first subframe. Data packets of a second data call are transmitted during the second and third subframe so that two data calls are concurrently transmitted.

17 Claims, 9 Drawing Sheets

SYSTEM AND METHOD FOR PROVIDING CONCURRENT DATA TRANSMISSIONS IN A WIRELESS COMMUNICATION NETWORK

TECHNICAL FIELD OF THE INVENTION

The present invention is directed, in general, to wireless communication systems and devices and, more specifically, to a system and method for providing concurrent data transmissions in a wireless communication network.

BACKGROUND OF THE INVENTION

Wireless communication systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone and the price of a wireless device is only a small part of the end-user's total cost. To continue to attract new customers, wireless service providers concentrate on reducing infrastructure costs and operating costs, and on increasing handset battery lifetime, while improving quality of service in order to make wireless services cheaper and better.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

CDMA technology is used in wireless computer networks, paging (or wireless messaging) systems, and cellular telephony. In a CDMA system, mobile stations and other access terminals (e.g., pagers, cell phones, laptop PCs with wireless modems) and base stations transmit and receive data on the same frequency in assigned channels that correspond to specific unique orthogonal codes. For example, a mobile station may receive forward channel data signals from a base station that are encoded, formatted, interleaved, spread with a Walsh code and a long pseudo-noise (PN) sequence. In another example, a base station may receive reverse channel data signals from the mobile station that are encoded, block interleaved, modulated, and spread with a spreading code derived from the mobile station identification number prior to transmission by the mobile station. The data symbols following interleaving may be separated into an in-phase (I) data stream and a quadrature (Q) data stream for QPSK modulation of an RF carrier. One such implementation is found in the TIA/EIA-95 CDMA standard (also known as IS-95). Another implementation is the TIA/EIA-2000 standard (also known as IS-2000).

The current generation of cellular phones is used primarily for voice conversations between a subscriber device (or wireless device) and another party through the wireless network. A smaller number of wireless devices are data devices, such as personal digital assistants (PDAs) equipped with cellular/wireless modems. Because the bandwidth for a current generation wireless device is typically limited to a few tens of kilobits per second (kbps), the applications for the current generation of wireless devices are relatively limited. However, this is expected to change in the next (or third) generation of cellular/wireless technology, sometimes referred to as "3G" cellular/wireless, where much greater bandwidth will be available to each wireless device (i.e., one hundred fifty three and six tenths kilobits per second (153.6 kbps) or greater). The higher data rates will make Internet applications for wireless devices much more common. For instance, a 3G cellular telephone (or a PC with a 3G cellular modem) may be used to browse web sites on the Internet, to transmit and receive graphics, to execute streaming audio or video applications, and the like. A much higher percentage of the wireless traffic handled by 3G cellular systems will be Internet protocol (IP) traffic and a lesser percentage will be traditional voice traffic.

Real-time streaming of multimedia content over Internet protocol (IP) networks has become an increasingly common application in recent years. As noted above, 3G wireless networks will provide streaming data (both video and audio) to wireless devices for real time applications. A wide range of interactive and non-interactive multimedia Internet applications, such as news on-demand, live TV viewing, video conferencing, live radio broadcasting (such as Broadcast.com), and the like, will provide "real time" data streaming to wireless devices. Unlike a "downloaded" video file, which may be retrieved first in "non-real" time and viewed or played back later, real time (or streaming) data applications require a data source to encode and to transmit a streaming data signal over a network to a receiver, which must decode and play the signal (video or audio) in real time.

A wireless communication network comprises a plurality of cell sites (or "cells"). Each cell contains at least one base station (BS). Each base station contains at least one base transceiver station (BTS) and an antenna. Each base station (BS) is capable of communicating with a plurality of mobile stations (MS).

In IS-95 based systems and in IS-2000 based systems, each cell may comprise one or more sectors. Each cell is associated with a base transceiver station, and the base transceiver station is associated with the number of directional antennas. The number of antennas is equal to or greater than the number of sectors in a cell. For example, consider a cell that is divided into three sectors. Assume that the number of mobile stations within the cell is uniformly distributed throughout the cell. Further assume that the capacity of each cell in the network is N mobile stations. The capacity of a sector in a cell that has three sectors is N/3 mobile stations.

During a given period of time, each sector antenna in the base transceiver station (BTS) in the base station (BS) of a cell simultaneously transmits the same data signals to the N mobile stations within the cell. In a three sector cell, (1) a first sector antenna in the base transceiver station transmits a data signal to the N mobile stations, and (2) a second sector antenna in the base transceiver station simultaneously transmits the same data signal to the N mobile stations, and (3) a third sector antenna in the base transceiver station simultaneously transmits the same data signal to the N mobile stations.

This prior art arrangement has some disadvantages. For example, consider a base transceiver station that is transmitting data to a mobile station in a unicast transmission mode. In a unicast transmission mode the data transmission from the base transceiver station is intended only for the mobile station. The base transceiver station then receives data to transmit to the mobile station in a broadcast transmission mode. In a broadcast mode the data transmission from the base transceiver station is intended for all of the mobile stations in the cell.

Because the mobile station is receiving data traffic on its dedicated channel, the base transceiver station has to transmit both the unicast mode information and the broadcast mode information to the mobile station on the dedicated channel. The base transceiver station must use an algorithm that does not terminate the current data call to the mobile station. The required mapping causes the packet length to be too long. The long transmission may result in an undesirable transmission time delay or may result in an increased error rate for the data traffic. This problem could be solved if there were a way to transmit both the unicast mode information and the broadcast mode information to the mobile station within a period of time that is shorter than the period of time required by prior art methods.

The presently existing IS-95 and IS-2000 systems do not provide for concurrent data transmissions in a wireless communication network. Therefore, there is a need in the art for a system and method that is capable of providing concurrent data transmissions in a wireless communication network. In particular, there is a need for a system and method that is capable of enabling base transceiver stations in a cell of a wireless communication network to coordinate and simultaneously transmit concurrent data transmissions to the mobile stations in the cell.

SUMMARY OF THE INVENTION

It is an object of the present invention to provide a system and method that is capable of providing concurrent data transmissions in a wireless communication network.

The system and method of the invention comprises a register unit within a base transceiver station of a base station of the wireless communications network. The register unit prepares data packets to be transmitted to mobile stations located within a plurality of sectors of the cell that is served by the base station. The register unit identifies the cell sector destination of each data packet in a first data call and sends the data packet to a buffer associated with the cell sector destination. There is one buffer associated with each cell sector. The buffers store their respective data packets for each cell sector in a first subframe of a data frame. The buffers send their respective data packets within the first subframe to their respective sector antennas for transmission to the mobile stations. The data packets for each cell sector are then concurrently transmitted during the first subframe of the data frame.

Each frame to be transmitted from a base transceiver station divides into three subframes in accordance with the three sector cell configuration. For example, there are six subframes for the six sector cell configuration. The other two subframes are redundancy subframes. Broadcast messages or other calls for future applications may be transmitted within these subframes.

It is an object of the present invention to provide a system and method capable of concurrently transmitting two or more data calls in a wireless communication network.

It is also an object of the present invention to provide a system and method capable of concurrently transmitting one of (or any combination of) unicast, multicast, or broadcast high speed bursty packet data in a wireless communication network.

It is also an object of the present invention to provide a system and method capable of providing a maximal rate of concurrent data packet transmissions in a wireless communication network.

It is another object of the present invention to provide a system and method capable of enhancing the capacity and throughput of data packets in a wireless communication network.

It is yet another object of the present invention to provide a system and method capable of providing concurrent data packet transmissions for two or more different applications.

It is an additional object of the present invention to provide a system and method capable of minimizing transmission time delays.

It is also an object of the present invention to provide a system and method capable of providing concurrent data packet transmissions for identical packet sizes and for different packet sizes from each cell sector.

It is also an object of the present invention to provide a system and method capable of providing concurrent data packet transmissions for data packets that have different Quality of Service (QoS) requirements.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless communications network.

Figure 1:
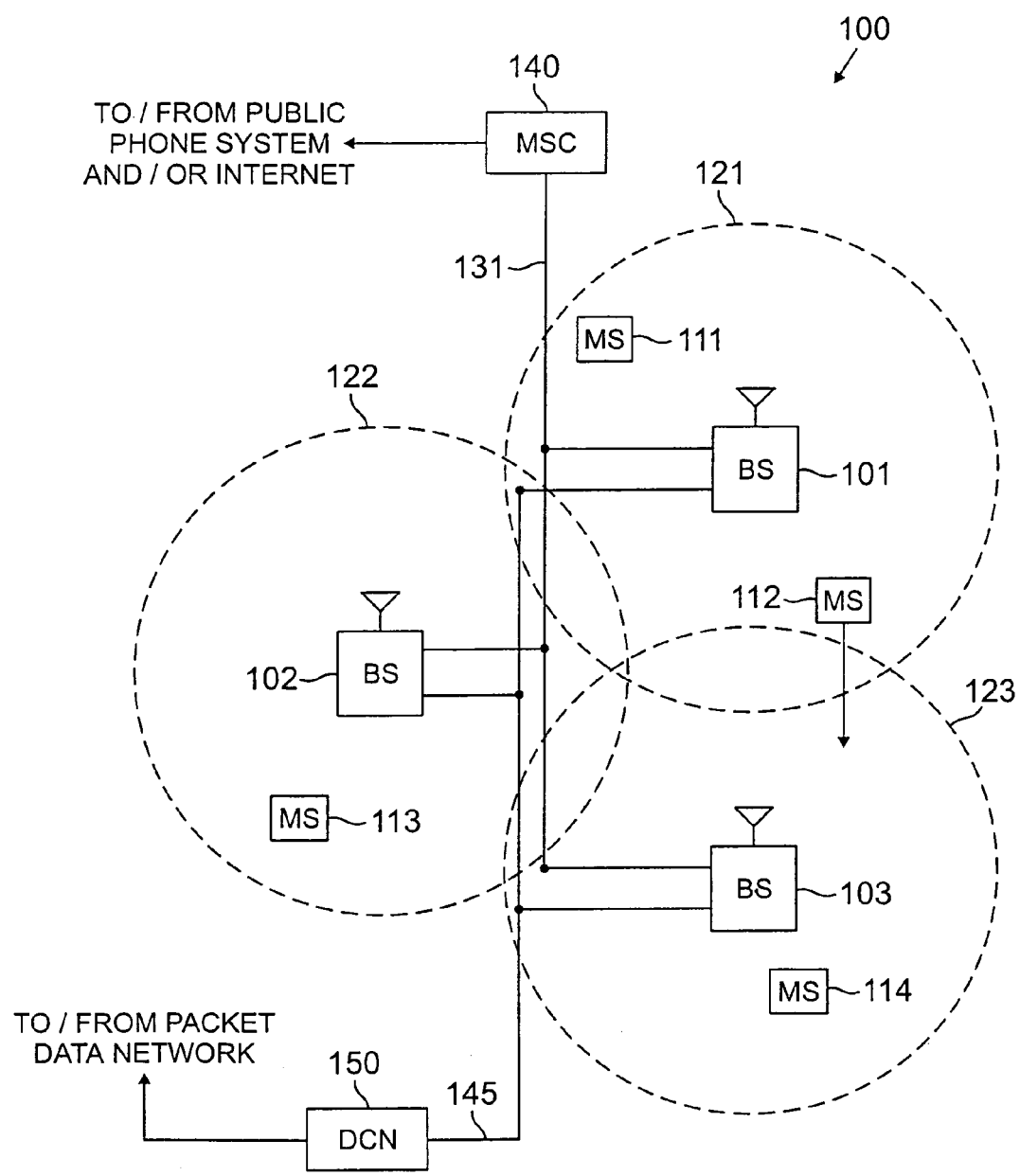
FIG. 1 illustrates an exemplary wireless communication network according to an advantageous embodiment of the present invention.

FIG. 1 illustrates an exemplary prior art wireless network 100 in accordance with the principles of the present invention. Wireless network 100 comprises a plurality of cell sites 121–123, each containing one of the base stations, BS 101, BS 102, or BS 103. Base stations BS 101 through ES 103 are capable of communicating with a plurality of mobile stations (MS) 111–114. Mobile stations 111–114 may be any suitable wireless communication devices, including conventional cellular telephones, PCS handset devices, portable computers, telemetry devices, and the like, which are capable of communicating with the base stations via wireless links. Other types of access terminals, including fixed access terminals, also may be present in wireless network 100. However, for the sake of simplicity, only mobile stations are shown.

Dotted lines show the approximate boundaries of the cell sites 121–123 in which the base stations BS 101–103 are located.

The cell sites are shown approximately circular for the purposes of illustration and explanation only. It should be clearly understood that the cell sites may have other irregular shapes, depending on the cell configuration selected and natural and man-made obstructions.

Each of the base stations BS 101, BS 102, and BS 103 may comprise a base station controller (BSC) and at least one base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver stations in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 links each vocoder in the base station controller (BSC) with switch elements in the mobile switching center (MSC) 140. In one advantageous embodiment, each link provides a digital path for transmission of voice signals in the pulse code modulated (PCM) format. Communications line 131 may be any suitable connection means, including a T1 line, a T3 line, a fiber optic link, a network backbone connection, and the like. In some embodiments, communications line 131 may be several different data links, where each data link couples one of BS 101, BS 102, or BS 103 to MSC 140.

BS 101, BS 102 and BS 103 transfer data signals between each other and the Internet or other packet data network (not shown) via communications line 145 and data core network (DCN) server 150. Data core network (DCN) server 150 is well known to those skilled in the art. Data core network (DCN) server 150 is a packet data switching or routing device that provides services and coordination between the subscribers in a wireless network and external packet data networks, such as a corporate Ethernet system and/or the Internet. Those skilled in the art will understand that line 145 interfaces to a packet data serving node (not shown) located in data core network 150. Communications line 145 may be any suitable connection line, including an Ethernet link, a T1 connection, a T3 line, a fiber optic link, a network backbone connection, and the like. In some embodiments, communications line 145 may comprise several different data links, where each data link couples one of BS 101, BS 102, or BS 103 to data core network (DCN) 150.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a handoff will occur.

As is well known to those skilled in the art, the handoff procedure transfers control of a call from a first cell to a second cell. A handoff may be either a "soft handoff" or a "hard handoff." In a "soft handoff" a connection is made between the mobile station and the base station in the second cell before the existing connection is broken between the mobile station and the base station in the first cell. In a "hard handoff" the existing connection between the mobile station and the base station in the first cell is broken before a new connection is made between the mobile station and the base station in the second cell.

For example, assume that mobile stations 111–114 communicate with base stations BS 101, BS 102 and BS 103 over code division multiple access (CDMA) channels. As MS 112 moves from cell 121 to cell 123, MS 112 determines that a handoff is required based on detection of a pilot signal from BS 103, increased bit error rate on signals from BS 101, signal round trip delay time between BS 101 and MS 112, or some other characteristic. When the strength of the control signal transmitted by BS 103, or the bit error rate of signals received from BS 101, or the round trip time delay exceeds a threshold, BS 101 initiates a handoff process by signaling MS 112 and the target BS 103 that a handoff is required. MS 112 sends a Pilot Strength Measurement Message (PSSM) to BS 101 that contains pilot strength data for BS 103. When the strength of the pilot transmitted by BS 103 and received and reported by MS 1121 exceeds a threshold, BS 101 initiates a soft handoff process by signaling BS 103 that a handoff is required. BS 103 and MS 112 proceed to negotiate establishment of a communications link. The call is thereby transferred from BS 101 to BS 103. An idle handoff is a handoff between cells of a mobile device that is communicating in the control or paging channel, rather than transmitting voice and/or data signals in the regular traffic channels.

One or more of the wireless devices in wireless network 100 may be capable of executing real time applications, such as streaming audio or streaming video applications. Wireless network 100 receives the real time data from, for example, the Internet through data core network (DCN) server 150 and through communications line 145 and transmits the real time data in the forward channel to the wireless device. For example, MS 112 may comprise a 3G cellular phone device that is capable of surfing the Internet and listening to streaming audio, such as music from the web site "www.mp3.com" or a sports radio broadcast from the web site "www.broadcast.com." MS 112 may also view streaming video from a news web site, such as "www.CNN.com." To avoid increasing the memory requirements and the size of wireless phone devices, one or more of the base stations in wireless network 100 provides real time data buffers that can be used to buffer real time data being sent to, for example, MS 112.

Figure 2:
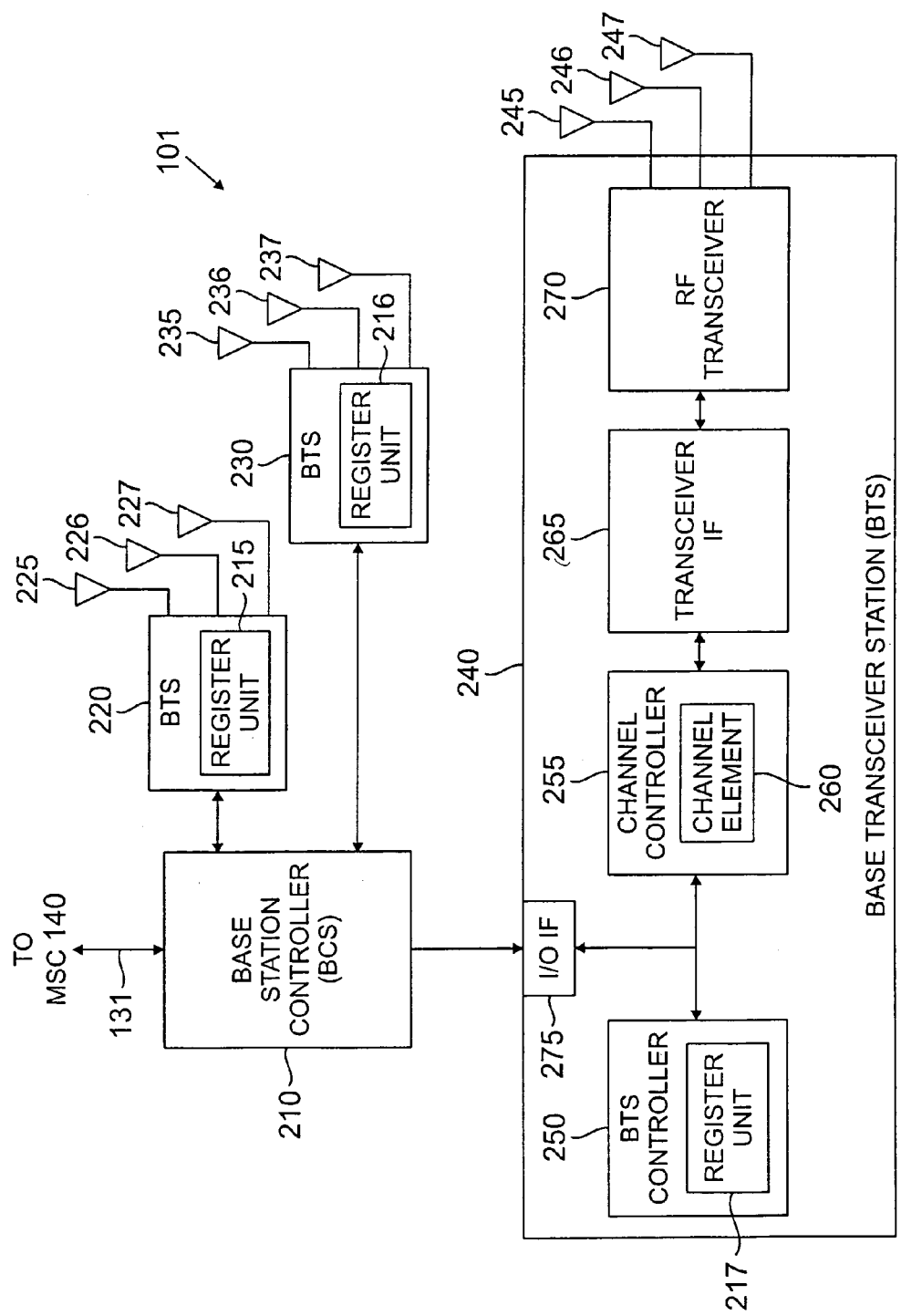
FIG. 2 illustrates an exemplary base station according to an advantageous embodiment of the present invention.

FIG. 2 illustrates exemplary base station 101 and base station controller 210 according to an advantageous embodiment of the present invention. Base station 101 comprises base station controller 210 and base transceiver stations BTS 220, BTS 230, and BTS 240. Base station controllers and base transceiver stations were described previously in connection with FIG. 1.

BSC 210 manages the resources in cell site 121, including BTS 220, BTS 230, and BTS 240. As described above, BSC 210 is coupled to MSC 140 over data communication line 131. A more detailed illustration of the elements of a base transceiver station is shown for BTS 240. Exemplary BTS 240 comprises BTS controller 250, channel controller 255 that contains exemplary channel element 260, transceiver interface (IF) 265, RF transceiver unit 270, and an antenna array comprising antenna 245, antenna 246, and antenna 247. Input/output interface (I/O IF) 275 couples BTS 240 to BSC 210.

BTS controller 250 controls the overall operation of BTS 240 and interfaces with BSC 210 through I/O IF 275. BTS controller 250 directs the operation of channel controller 255. Channel controller 255 contains a number of channel elements such as channel element 260. The channel elements perform bi-directional communications in the forward and reverse links. Depending on the air interface used by the system of BS 101, the channel elements engage in time division multiple access (TDMA), frequency division multiple access (FDMA), or code division multiple access (CDMA) communications with the mobile stations in cell 121.

Transceiver IF 265 transfers the bi-directional channel signals between channel controller 255 and RF transceiver 270. Transceiver IF 265 converts the radio frequency signal from RF transceiver 270 to an intermediate frequency (IF). Channel controller 255 then converts this intermediate frequency (IF) to baseband frequency. Additionally, RF transceiver 270 may contain an antenna selection unit to select among antenna 245, antenna 246 and antenna 247 during both transmit and receive operations.

The antenna array comprises directional antennas 245, 246 and 247, that transmit forward link signals, received from RF transceiver 270, to mobile stations in the sectors covered by BS 101. The antenna array also receives reverse link signals from the mobile stations and sends the signals to RF transceiver 270. In an advantageous embodiment of the present invention, the antenna array comprises a multi-sector antenna, such as a three-sector antenna, in which each antenna is responsible for transmitting and receiving in a one hundred twenty degree (120°) arc of coverage area, or a six-sector antenna, in which each antenna is responsible for transmitting and receiving in a sixty degree (60°) arc of coverage area.

In one advantageous embodiment of the present invention BTS 220 and BTS 230 are identical in structure and function to BTS 240 as described above. BTS 220 is coupled to BSC 210 and to antenna array comprising antenna 225, antenna 226 and antenna 227. BTS 230 is coupled to BSC 210 and to an antenna array comprising antenna 235, antenna 236 and antenna 237.

BS 101 of the present invention is not limited to the architecture described above. The architecture may be different depending on the type of air interface standard used by the wireless system. Additionally, the present invention is not limited by the frequencies used. Different air interface standards require different frequencies.

In an advantageous embodiment of the present invention, base station controller BSC 210 comprises register unit 215 of the present invention. BSC 210 comprises a microprocessor (also known as a microcontroller) and a memory unit. The microprocessor and the memory unit of BSC 210 are not shown in FIG. 2. The microprocessor of BSC 210 is capable of executing software applications stored in the memory unit. Register unit 215 comprises a portion of BTS 220. Register unit 216 comprises a portion of BTS 230. Register unit 217 comprises a portion of BTS 240. As will be more fully described, register unit 215, register unit 216 and register unit 217 are each capable of carrying out the present invention.

Figure 3:
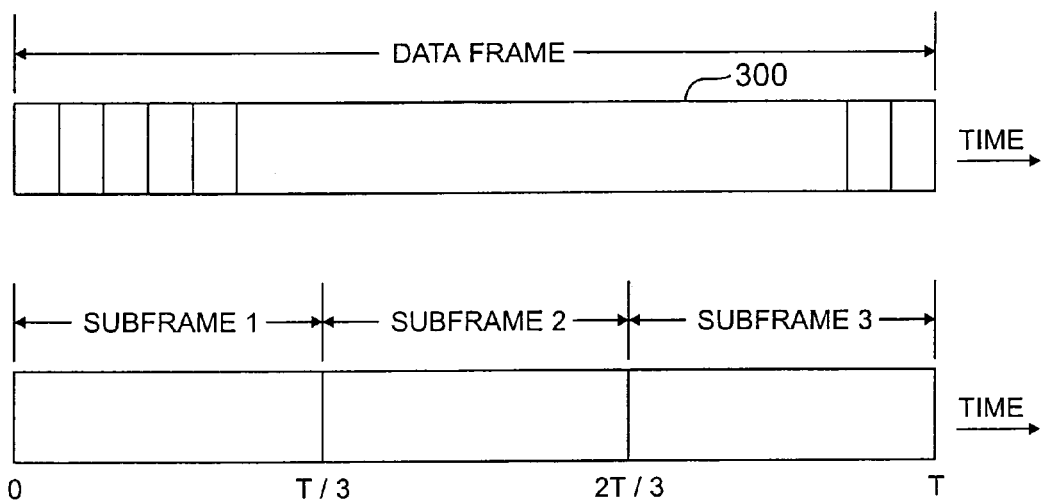
FIG. 3 illustrates an exemplary data transmission frame of the present invention and three subframes of the data transmission frame.

FIG. 3 illustrates an exemplary data frame 300 of the present invention for use in transmitting data to a mobile station located with a cell that has three sectors. The length of time of data frame 300 is designated with the letter T. That is, the letter T represents the total time of all of the of time slots in data frame 300. The time slots in data frame 300 are shown by vertical lines that divide data frame 300 into time slot portions. Not all of the time slots of data frame 300 are shown in FIG. 3. Only a representative number of time slots are shown.

Data frame 300 comprises three subframes of equal length. They are subframe 1, subframe 2, and subframe 3. Each subframe contains the same number of time slots. In this example, each subframe contains one third (⅓) of the total time slots in data frame 300. Subframe 1 comprises the first third of the time slots from zero (0) to T/3. Subframe 2 comprises the second third of the time slots from T/3 to 2T/3. Subframe 3 comprises the third third of the time slots from 2T/3 to T.

Data frame 300 and its three subframes are shown as an exemplary data frame for a cell that has three sectors. However, the present invention is not limited to a base station that has three sectors in its cell. It is understood that other advantageous embodiments of the present invention may be used for a base station that has more than three sectors or less than three sectors in its cell. The number of subframes in a data frame is selected in accordance with the number of sectors in a particular cell. The number of cell sectors in this example is chosen to be three for the purposes of illustration and explanation.

Figure 4:
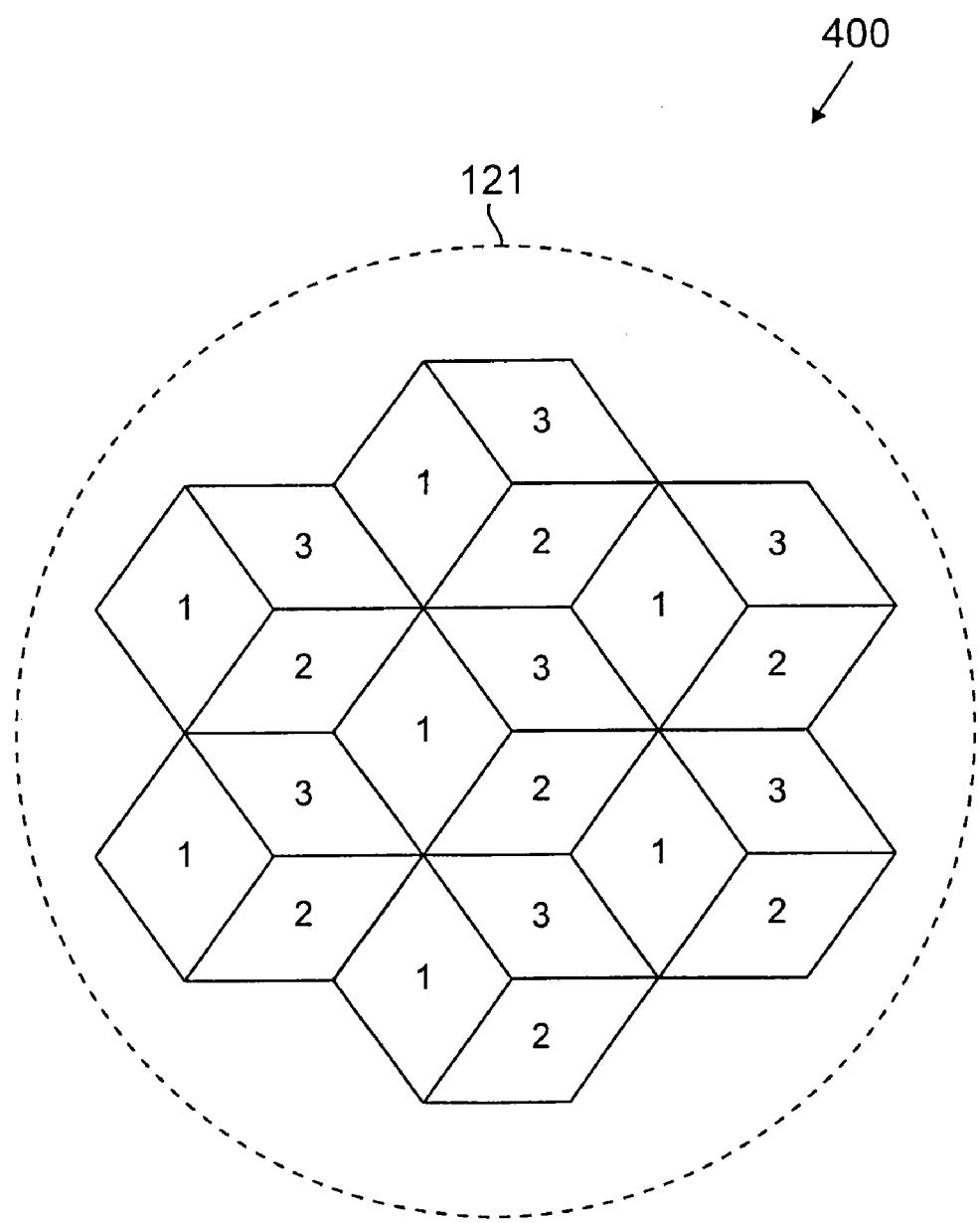
FIG. 4 illustrates an arrangement of three sectors within a three sector cell according to an advantageous embodiment of the present invention.

FIG. 4 illustrates an arrangement 400 of three sectors within cell 121 according to an advantageous embodiment of the present invention. In this illustrative example, cell 121 is equally divided into three sectors. The three sectors are numbered 1, 2, and 3 as shown in FIG. 4. The leftmost quadrilateral portion from the center of cell 121 is numbered 1 as a portion of Sector 1. Proceeding counterclockwise around the center of cell 121, the next quadrilateral portion is numbered 2 as a portion of Sector 2. Continuing counterclockwise around the center of cell 121, the next quadrilateral portion is numbered 3 as a portion of Sector 3. These three quadrilateral portions form a hexagonal shape that is repeated to cover the area of cell 121. The numbering pattern is the same in the other cells of the wireless network (e.g., cell 122 and cell 123).

Base station 101 is capable of supporting N mobile stations within cell 121. The N mobile stations are distributed randomly within cell 121. Therefore, on average, the number of mobile stations within each of the three sectors will be one third of N (i.e., N/3 mobile stations per sector).

For purposes of illustration assume that BTS 220 (and antenna 225, antenna 226 and antenna 227) are assigned to transmit data. Antenna 225, antenna 226 and antenna 227 are assigned to transmit data to and from Sector 1, Sector 2 and Sector 3, respectively. Further assume that BTS 230 (and antenna 235, antenna 236 and antenna 237) is assigned to transmit data in the same manner as BTS 220. Specifically, antenna 235, antenna 236 and antenna 237 are assigned to transmit data to and from Sector 1, Sector 2 and Sector 3, respectively. Further assume that BTS 240 (and antenna 245, antenna 246 and antenna 247) is assigned to transmit data in the same manner as BTS 220 and BTS 230. Specifically, antenna 245, antenna 246 and antenna 247 are assigned to transmit data to and from Sector 1, Sector 2 and Sector 3, respectively.

Figure 5:
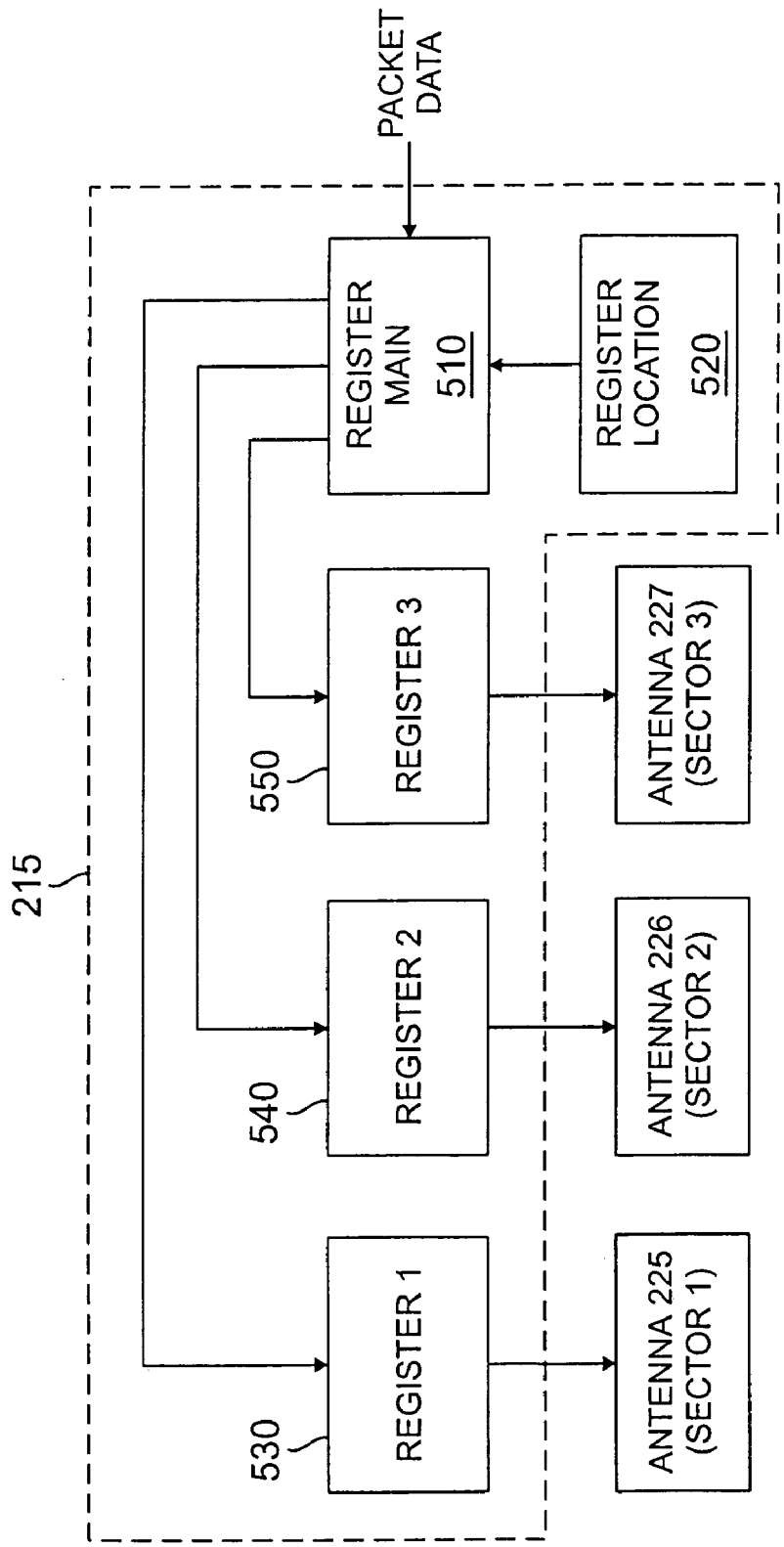
FIG. 5 illustrates a block diagram of a register unit of an advantageous embodiment of the present invention and its connection to base transceiver stations and antennas of a base station.

FIG. 5 illustrates a block diagram of register unit 215 of an advantageous embodiment of the present invention. Register unit 215 in BTS 220 is connected to antenna 225 for Sector 1, to antenna 226 for Sector 2, and to antenna 227 for Sector 3. Register unit 215 receives data packets in "first in first out" (FIFO) buffer that is designated as Register Main 510. Register Main 510 is coupled to a buffer designated as Register Location 520. Register Location 520 receives location information from BSC 210 through a data signal line not shown in FIG. 5. The location information in Register Location 520 contains information concerning the location of all of the mobile stations and their respective performance guarantees. Register Location 520 provides this information to Register Main 510.

A first output of Register Main 510 is connected to a first FIFO buffer 530 that is designated as Register 1. The output of FIFO buffer 530 (Register 1) is connected to antenna 225. FIFO buffer 530 (Register 1) stores data packets that are to be transmitted to Sector 1.

A second output of Register Main 510 is connected to a second FIFO buffer 540 that is designated as Register 2. The output of FIFO buffer 540 (Register 2) is connected to antenna 226. FIFO buffer 540 (Register 2) stores data packets that are to be transmitted to Sector 2.

A third output of Register Main 510 is connected to a third FIFO buffer 550 that is designated as Register 3. The output of FIFO buffer 550 (Register 3) is connected to antenna 227. FIFO buffer 550 (Register 1) stores data packets that are to be transmitted to Sector 3.

Data packets that arrive in BSC 210 from MSC 140 that are to be transmitted from base station BS 101 in a unicast transmission mode are processed in register unit 215. The data packets are sent to Register Main 510. Register Main 510 obtains information from Register Location 520 to identify the packet direction of each data packet that arrives in Register Main 510.

If a data packet is targeted for a mobile station in Sector 1, the data packet is stored in FIFO buffer 530 (Register 1). If a data packet is targeted for a mobile station in Sector 2, the data packet is stored in FIFO buffer 540 (Register 2). If a data packet is targeted for a mobile station in Sector 3, the data packet is stored in FIFO buffer 550 (Register 3). Register Main 510 continues to distribute the data packets until the last data packet in a data frame has been processed.

Each FIFO buffer 530, 540 and 550 stores the associated data packets during the first T/3 time slots (subframe 1) and delivers those data packets to their respective antennas, antenna 225, antenna 226 and antenna 227. In accordance with the principles of the present invention, antenna 225, antenna 226 and antenna 227 each transmit the data to be transmitted to their respective sectors during the first third of the time period T of data frame 300. Antenna 225, antenna 226 and antenna 227 each transmit data during the time that is represented by subframe 1 (i.e., the first third of the time slots from zero (0) to T/3).

Figure 6:
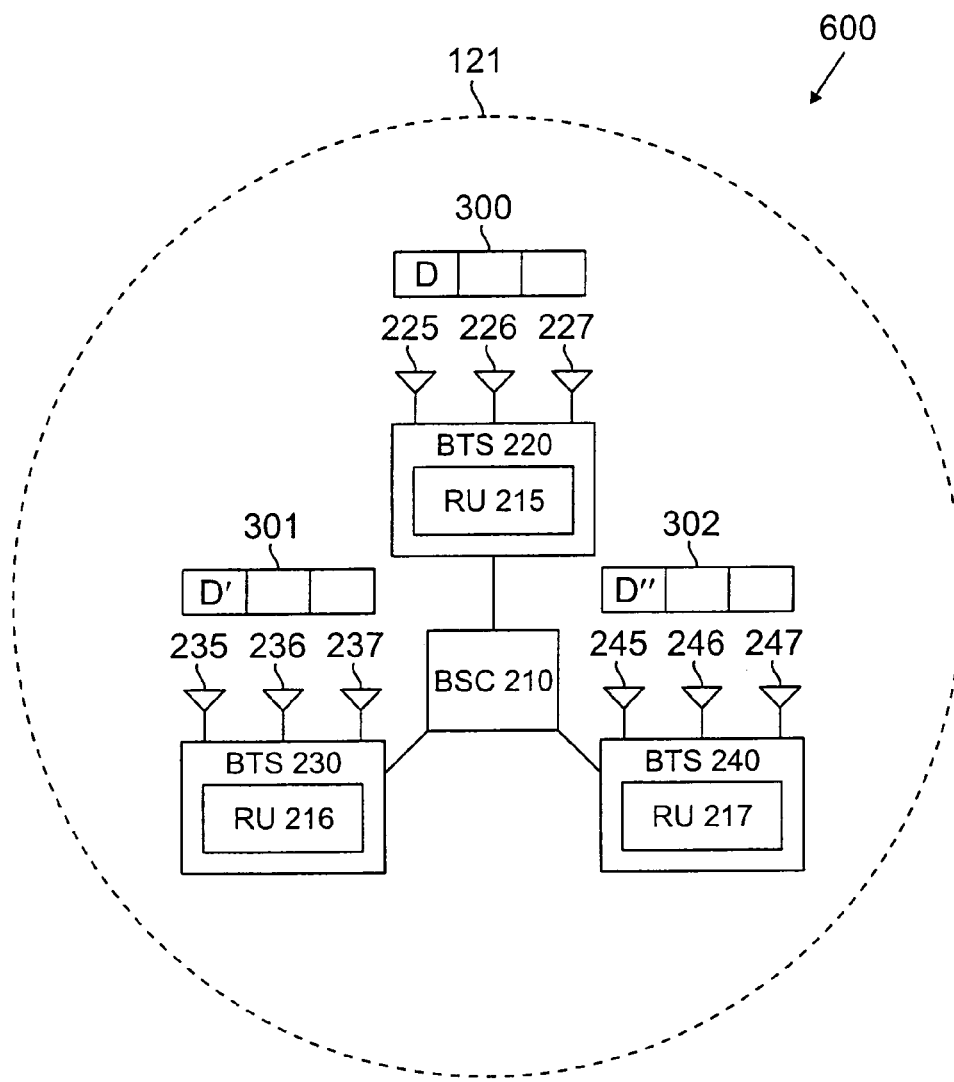
FIG. 6 illustrates a base station in a three sector cell according to an advantageous embodiment of the present invention showing how three base transceiver stations simultaneously transmit a signal to all mobile stations in the cell.

In this manner the data transmissions to the three sectors in cell 121 are made concurrently during the time of subframe 1. This feature may perhaps be better understood with reference to FIG. 6 and FIG. 7. A base station arrangement 600 comprising base station 101 is shown in FIG. 6. BTS 220, BTS 230 and BTS 240 each send an assigned data transmission within the time period of data frame 300, data frame 301, and data frame 302, respectively. Subframe 1 of data frame 300 contains information designated with the letter D. Subframe 2 and subframe 3 of data frame 300 may contain other information. The Letter D' represents information within Subframe 1 of data frame 301, and the letter D" represents information within Subframe 1 of data frame 302. The information designated with the letter D within subframe 1 of data frame 300 contains the information designated with the letters A, B and C in FIG. 7.

Figure 7:
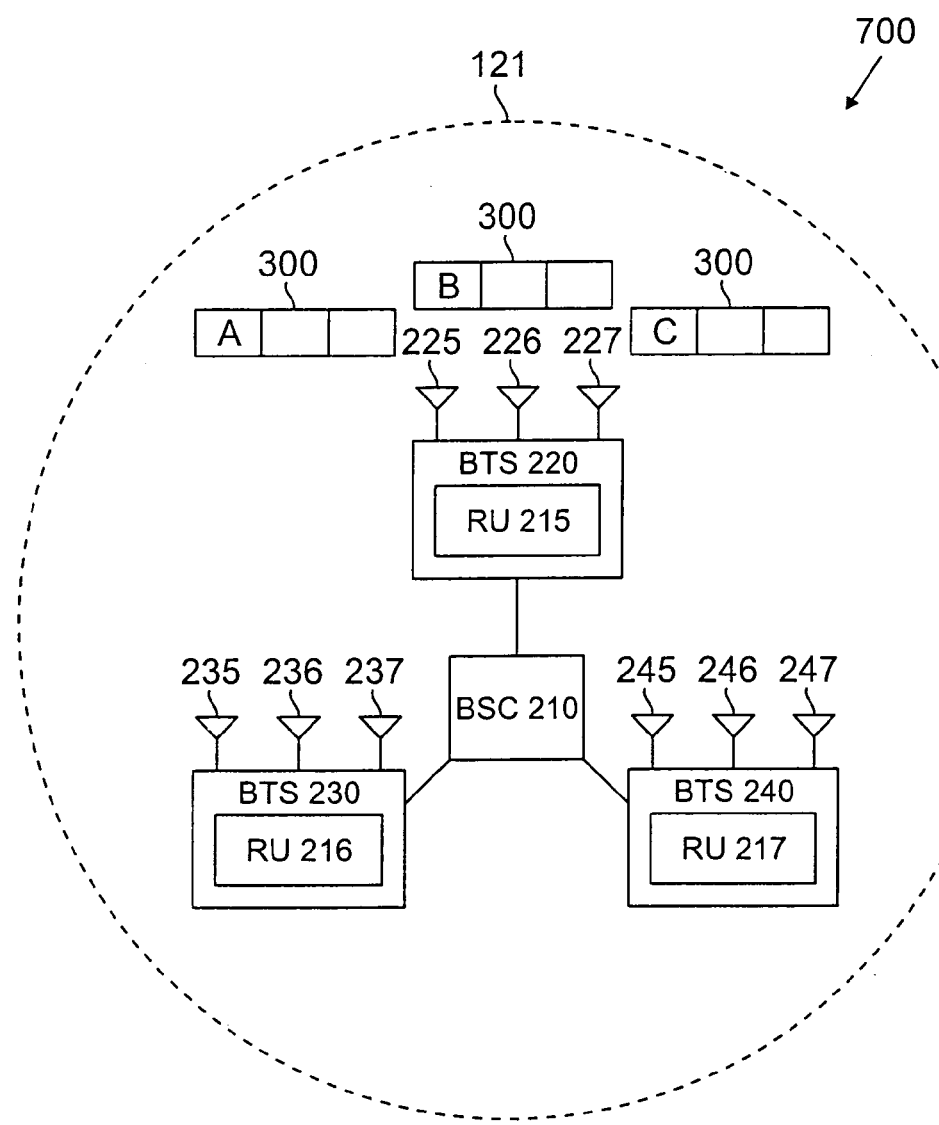
FIG. 7 illustrates a base station in a three sector cell according to an advantageous embodiment of the present invention showing how three base transceiver stations simultaneously transmit a portion of a signal to mobile stations in each cell sector.

Now consider base stations arrangement 700 shown in FIG. 7 that comprises base station controller 210, base transceiver station 220 and register unit (RU) 215 of the present invention. Antenna 225, antenna 226 and antenna 227 each send a different data transmission within the time period of data frame 300. Subframe 1 of data frame 300 from antenna 225 contains the information designated with the letter A. Subframe 1 of data frame 300 from antenna 226 contains the information designated with the letter B. Subframe 1 of data frame 300 from antenna 227 contains the information designated with the letter C. In this manner, the information that is designated with the letters A, B and C is transmitted concurrently.

The two blank portions of each data frame 300 shown in FIG. 7 represent subframe 2 and subframe 3. Subframe 2 and subframe 3 each contain T/3 time slots. This means that the present invention provides a savings of 2T/3 time slots for each data frame 300. Other data may be sent during the time represented by subframe 2 and during the time represented by subframe 3.

The example shown in FIG. 7 illustrates that the different data transmissions A, B and C may be sent during subframe 1. The invention is not limited to sending data during subframe 1. Subframe 1 is merely an example. The data may be sent during any selected subframe. As previously mentioned, any number N of subframes may be used to practice the invention.

Figure 8:
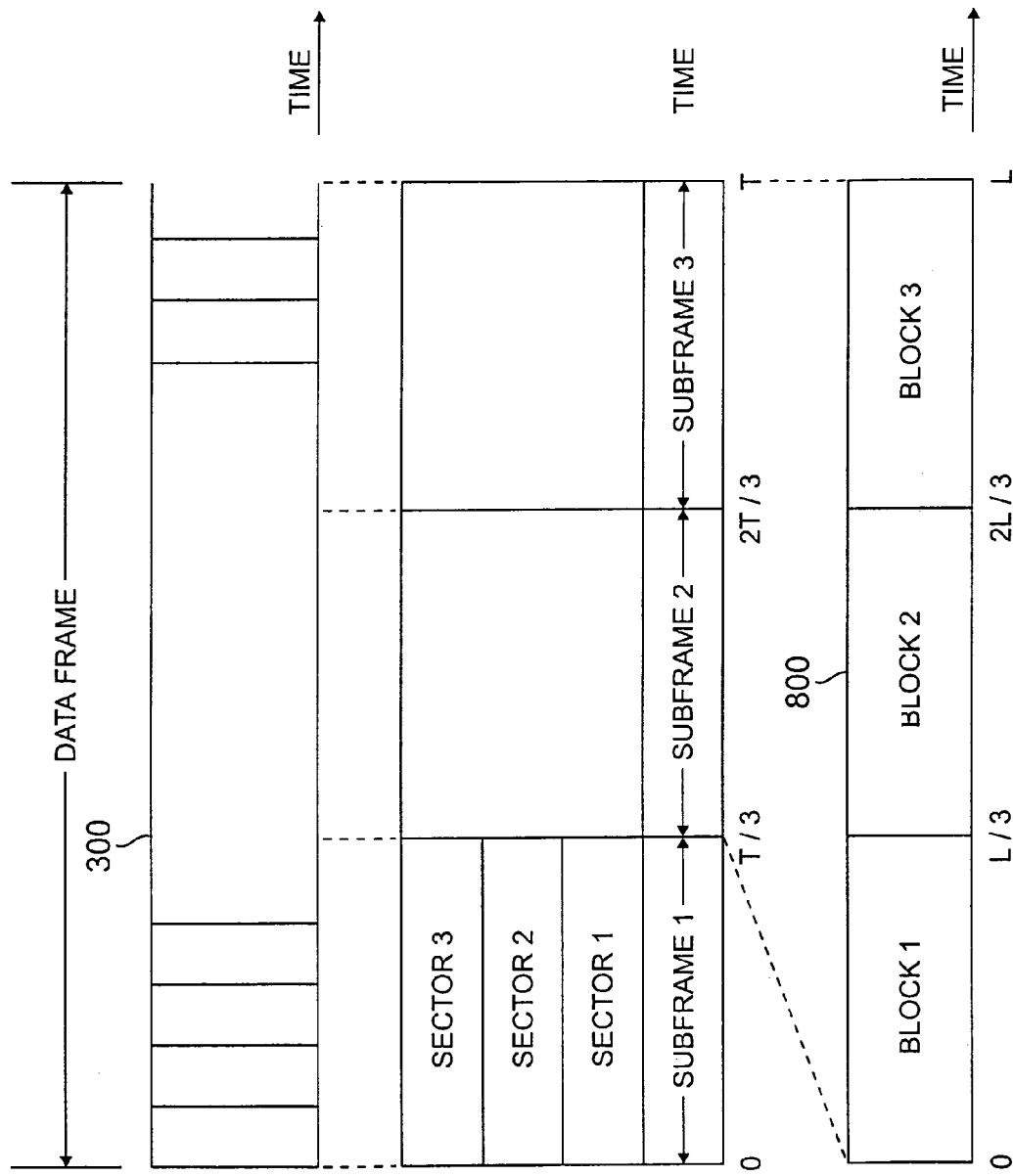
FIG. 8 illustrates an exemplary data transmission frame of the present invention and three subframes of the data transmission frame showing the location of data transmissions within the first subframe and showing how the second and third subframe may be divided into three blocks.

FIG. 8 illustrates exemplary data frame 300 of the present invention and its three component subframes. FIG. 8 also shows that the data to be transmitted to Sector 1, Sector 2 and Sector 3 of cell 121 is transmitted during the time represented by subframe 1. The data transmissions to Sector 1, Sector 2 and Sector 3 occur simultaneously in the manner previously described during the time period represented by the first T/3 time slots in data frame 300 (subframe 1).

FIG. 8 also shows that the unused T/3 time slots in subframe 2 and the unused T/3 time slots in subframe 3 may be added together to form data frame 800. Data frame 800 comprises Block 1, Block 2 and Block 3. The length of time of data frame 800 equals 2T/3. The length of time of data frame 800 is designated by the 20 letter L. Therefore the length of time of each of Block 1, Block 2 and Block 3 is L/3. The length of time of each of Block 1, Block 2 and Block 3 in terms of T is (2T/3)/3 or 2T/9.

In one advantageous embodiment of the present invention, the time slots in Block 1 are assigned to Sector 1, the time slots in Block 2 are assigned to Sector 2, and the time slots in Block 3 are assigned to Sector 3. The time slots in Block 1, Block 2 and Block 3 may be dynamically assigned to provide more spectral efficiency. If more data packets need to be transmitted (either in the unicast transmission mode or in the broadcast transmission mode), then time slots in subframe 2 or in subframe 3 may be scheduled for the data packet transmissions. The schedule for data packets for Sector 1 may use time slots from the beginning of subframe 2 (at T/3) (or, equivalently, the beginning of Block 1) to the end of Block 1 (at L/3). The schedule for data packets for Sector 2 may use time slots from the beginning of Block 2 (at L/3) to the end of Block 2 (at 2L/3). The schedule for data packets for Sector 3 may use time slots from the beginning of Block 3 (at 2L/3) to the end of Block 3 (at L).

Access is managed by time division multiplexing (TDM). Access is controlled based on time slot availability and sector number. Use of the otherwise unused time slots in subframe 2 and subframe 3 enables the present invention to provide concurrent data packet transmissions both in the unicast transmission mode and in the broadcast transmission mode. The present invention may be used to provide reliable concurrent data packet transmissions for identical or different data packet sizes from each sector and different Quality of Service (QoS) requirements.

It is seen that the present invention provides concurrent data packet transmissions for unicast and broadcast high speed bursty data in the forward links of a wireless communication network. The present invention is capable of providing maximal concurrent data packet transmissions, enhancing throughput, and simultaneously providing service to two or more different applications. For example, the present invention can simultaneously provide a standard data call and an emergency call (e.g. a 911 call) Register unit 215 of BTS 220, register unit 216 of BTS 230, and register unit 217 of BTS 240 that are required to carry out the present invention may be added to existing base stations with minimal cost impact.

Figure 9:
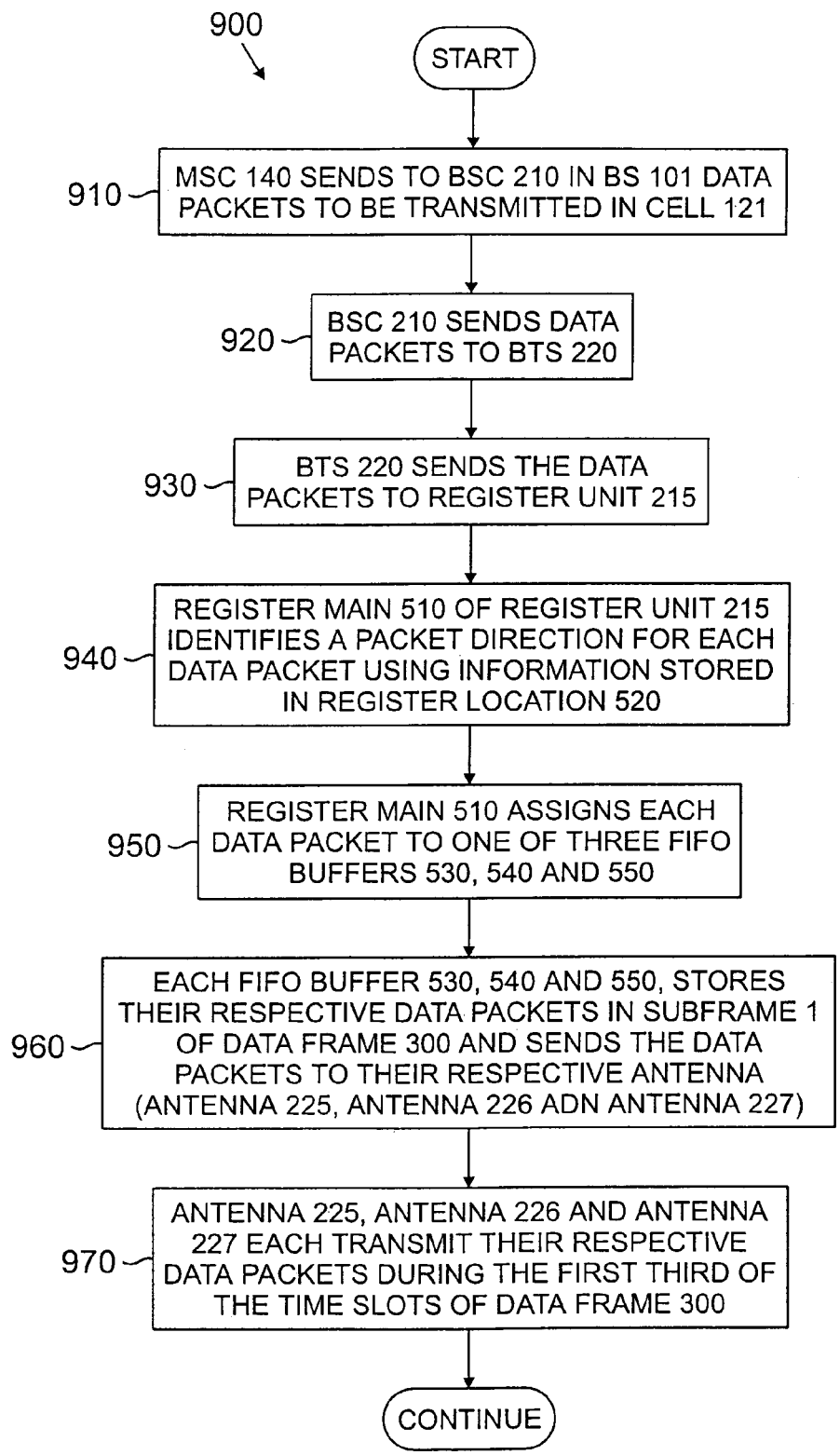
FIG. 9 illustrates a flow chart showing the steps of an advantageous embodiment of a method of the present invention for providing concurrent data transmissions in a wireless communication network.

FIG. 9 illustrates a flow chart 900 showing the steps of an advantageous embodiment of a method of the present invention for providing concurrent data transmissions in a wireless communication network. Mobile switching center (MSC) 140 sends to the base station controller (BSC) 210 in base station (BS) 101 data packets to be transmitted to one or more mobile stations in within cell 121 (step 910). BSC 210 sends the data packets to BTS 220 (step 920). BTS 220 sends the data packets to register unit 215 for processing (step 930). Register main 510 of register unit 215 identifies a packet direction for each data packet using information stored in register location 520 (step 940). Then register main 510 assigns each data packet to one of three FIFO buffers, 530, 540 and 550 (step 950). Each FIFO buffer, 530, 540 and 550, stores their respective data packets in subframe 1 of data frame 300 and sends their respective data packets in subframe 1 to their respective antennas, antenna 225, antenna 226 and antenna 227 (step 960). Then antenna 225, antenna 226 and antenna 227 each transmit their respective data packets during the first third of the time slots of data frame 300 (step 970). The process continues in this manner as data packets are received. Transmitting the data packets in subframe 1 makes available the time slots in subframe 2 and subframe 3 of data frame 300.

Although the present invention has been described in detail, those skilled in the art should understand that they can make various changes, substitutions and alterations herein without departing from the spirit and scope of the invention in its broadest form.

What is claimed is:

1. For use in a wireless network, a base station comprising an antenna array capable of transmitting forward channel data into S sectors associated with said base station, wherein said base station receives a plurality of data packets in a first data frame of a wireline connection, associates a first one of said received data packets with a corresponding first one of said S sectors, associates a second one of said received data packets with a corresponding second one of said S sectors, said first and second sectors being different ones of said S sectors, and concurrently transmits said first and second data packets in said corresponding first and second sectors during a first subframe of a first forward channel data frame, and wherein said first data frame of said wireline connection has a duration T, said first forward channel data frame has a duration T, and said first subframe has a duration less than T.

2. The base station as set forth in claim 1, wherein said base station is further capable of transmitting a first additional data packet associated with said first sector in said first sector during a period of said first forward channel data frame following said first subframe.

3. The base station as set forth in claim 2, wherein said base station is further capable of transmitting a second additional data packet associated with said second sector in said second sector during said period of said first forward channel data frame following said first subframe.

4. The base station as set forth in claim 3, wherein said base station transmits said first additional data packet and said second additional data packet sequentially.

5. The base station as set forth in claim 1, wherein said base station is further capable of transmitting a first additional data packet associated with said first sector in said first sector in a first dedicated time slot of said first forward channel data frame following said first subframe.

6. The base station as set forth in claim 5, wherein said base station is further capable of transmitting a second additional data packet associated with said second sector in said second sector in a second dedicated time slot of said first forward channel data frame following said first subframe.

7. The base station as set forth in claim 6, wherein said first dedicated time slot and said second dedicated time slot are sequential time slots.

8. A wireless network comprising a plurality of base stations capable of communicating with a plurality of mobile stations in a coverage area of said wireless network,
wherein a first one of said plurality of base stations comprises an antenna array capable of transmitting forward channel data into S sectors associated with said first base station, and
wherein said first base station
receives a plurality of data packets in a first data frame of a wireline connection,
associates a first one of said received data packets with a corresponding first one of said S sectors,
associates a second one of said received data packets with a corresponding second one of said S sectors, said first and second sectors being different ones of said S sectors, and
concurrently transmits said first and second data packets in said corresponding first and second sectors during a first subframe of a first forward channel data frame,
and wherein said first data frame of said wireline connection has a duration T, said first forward channel data frame has a duration T, and said first subframe has a duration less than T.

9. The wireless network as set forth in claim 8, wherein said first base station is further capable of transmitting a first additional data packet associated with said first sector in said first sector during a period of said first forward channel data frame following said first subframe.

10. The wireless network as set forth in claim 9, wherein said first base station is further capable of transmitting a second additional data packet associated with said second sector in said second sector during said period of said first forward channel data frame following said first subframe.

11. The wireless network as set forth in claim 10, wherein said first base station transmits said first additional data packet and said second additional data packet sequentially.

12. The wireless network as set forth in claim 11, wherein said first base station is further capable of transmitting a first additional data packet associated with said first sector in said first sector in a first dedicated time slot of said first forward channel data frame following said first subframe.

13. The wireless network as set forth in claim 12, wherein said first base station is further capable of transmitting a second additional data packet associated with said second sector in said second sector in a second dedicated time slot of said first forward channel data frame following said first subframe.

14. The wireless network as set forth in claim 13, wherein said first dedicated time slot and said second dedicated time slot are sequential time slots.

15. For use in a base station of a wireless network, a method of transmitting forward channel data into S sectors associated with the base station comprising the steps of:
receiving in the base station a plurality of data packets in a first data frame of a wireline connection;
associating a first one of the received data packets with a corresponding first one of the S sectors;
associating a second one of the received data packets with a corresponding second one of the S sectors, wherein the first and second sectors are different ones of the S sectors; and
transmitting concurrently the first and second data packets in the corresponding first and second sectors during a first subframe of a first forward channel data frame,
wherein the first data frame of the wireline connection has a duration T, the first forward channel data frame has a duration T, and the first subframe has a duration less than T.

16. The method as set forth in claim 15, further comprising the steps of:
transmitting a first additional data packet associated with the first sector in the first sector during a period of the first forward channel data frame following the first subframe; and
transmitting a second additional data packet associated with the second sector in the second sector during the period of the first forward channel data frame following the first subframe.

17. The method as set forth in claim 16, wherein the first additional data packet and the second additional data packet are transmitted sequentially.

* * * * *

UNITED STATES PATENT AND TRADEMARK OFFICE
CERTIFICATE OF CORRECTION

PATENT NO.         : 7,050,809 B2
APPLICATION NO. : 10/034399
DATED               : May 23, 2006
INVENTOR(S)       : Jae Doeg Lim It is certified that error appears in the above-identified patent and that said Letters Patent is hereby corrected as shown below:

Column 11, line 41, delete "20" before the term "letter".

Signed and Sealed this

Thirtieth Day of January, 2007

JON W. DUDAS
*Director of the United States Patent and Trademark Office*